United States Patent [19]
Rankin

[11] Patent Number: 6,112,584
[45] Date of Patent: Sep. 5, 2000

[54] MAGNICHANICAL SENSOR

[75] Inventor: Brent C. Rankin, Lima, Ohio

[73] Assignee: Honda of America, Mfg., Inc., Marysville, Ohio

[21] Appl. No.: 09/235,890

[22] Filed: Jan. 22, 1999

[51] Int. Cl.[7] .................................................. B23Q 17/00
[52] U.S. Cl. ............................................. 73/119 R; 73/116
[58] Field of Search .................... 73/116, 117.2, 73/117.3, 118.1, 119 R

[56] References Cited

U.S. PATENT DOCUMENTS 4,351,097  9/1982  Hashimoto et al. .
4,789,351 12/1988  Fisher, Jr. et al. .
4,875,786 10/1989  DeWachter .
5,059,844 10/1991  Anstine .
5,875,536  3/1999  Ring .

Primary Examiner—Eric S. McCall
Attorney, Agent, or Firm—Barbara Joan Haushalter; Alan McDonald

[57] ABSTRACT

A system and method are provided for detecting the presence of a snap ring in a bearing assembly of a transmission system. A magnetic field is generated and a switch is positioned within the magnetic field, whereby the switch switches from its normal position to an opposite position when a snap ring is placed in the magnetic field. In response to the switch position, the presence or absence of the snap ring is indicated.

21 Claims, 6 Drawing Sheets

MAGNICHANICAL SENSOR

FIELD OF THE INVENTION

This invention relates generally to vehicle transmission assembly, and more particularly, to determining the presence of a snap ring in a vehicle transmission.

BACKGROUND OF THE INVENTION

As part of the transmission assembly process, a bearing press is used to press bearings into the rear of the transmission case. The bearing aperture is inside the transmission, making the bearing press installation difficult to observe. At the same time the bearing is being pressed into the case, a snap ring is installed in a snap ring groove to hold the bearing in its proper location. The presence of the snap ring is critical during the pressing operation. That is, the omission of the snap ring cannot be detected during the remainder of the transmission assembly process.

Related to the magnichanical sensor described and claimed herein is a snap ring position detection system and method described in a first copending patent application having U.S. Ser. No. 09/235,725 and filing date of Jan. 22, 1999, and having the common inventor and assignee herewith. An apparatus and method for fabrication and testing of the magnichanical sensor described and claimed herein and the snap ring position detection system and method of the first copending patent application is described in a second copending patent application having a U.S. Ser. No. 09/235,889 and filing date of Jan. 22, 1999, and having the common inventor and assignee herewith. The first copending patent application having U.S. Ser. No. 09/235,725 and the second copending patent application having U.S. Ser. No. 09/235,889 are incorporated herewith by reference.

Therefore, among the purposes of this invention is to detect the presence of a snap ring in a transmission assembly process.

Also a purpose of this invention is the novel snap ring device enhancement to facilitate detection of the snap ring during the transmission assembly process.

Another purpose of this invention is the ability to reliably detect the presence of the snap ring in spite of limited space and close tolerances during the installation process.

SUMMARY OF THE INVENTION

These purposes are achieved by the snap ring presence detection system according to the present invention, wherein the snap ring is configured to accommodate the detection of the presence of the snap ring in the snap ring groove, to hold the bearing in its proper location, during the transmission assembly process.

In accordance with one embodiment of the present invention, a detection system is provided for detecting the presence of a snap ring in a bearing assembly of a transmission system. The presence of the snap ring is detected using magnetic-mechanical, or magnichanical, sensor means, without the need for a tactile feature.

The primary advantage provided by the present invention is to detect the presence of a snap ring during the pressing operation of pressing bearings into transmission cases.

Other objects and advantages of the invention will be apparent from the following description, the accompanying drawings and the appended claims, to which reference may be had for a full understanding of the nature of the present invention.

DESCRIPTION OF THE PREFERRED EMBODIMENTS

Figure 1:
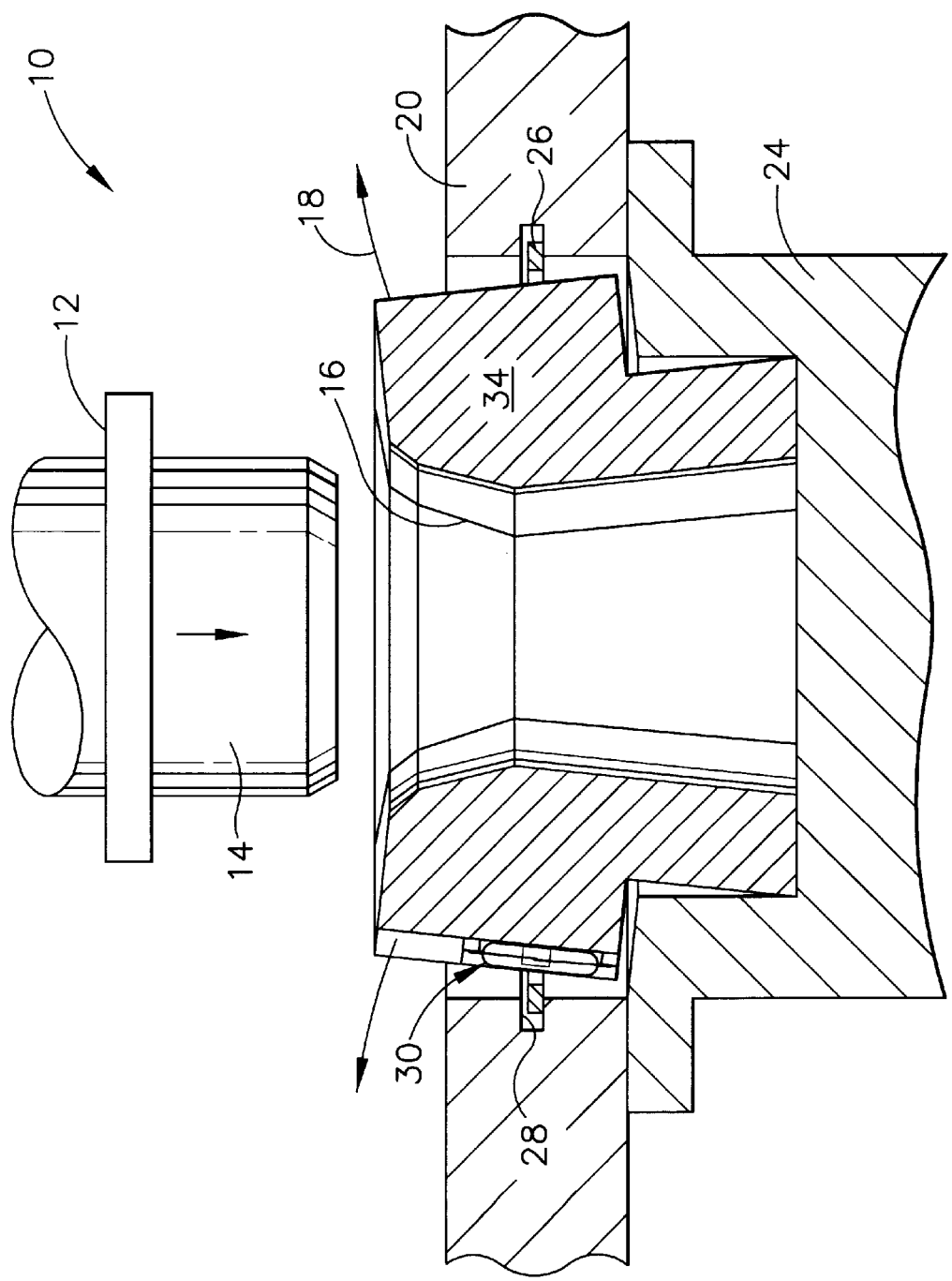
FIG. 1 illustrates a transmission assembly process, showing the snap ring, with a presence detection system and a position detection system incorporated therein.

In a transmission assembly process, as illustrated in FIG. 1, a transmission assembly 10 includes a bearing 12, held with a spreader pin 14. The spreader pin 14 is inserted into bearing aperture 16, which spreads open in the direction of arrows 18 to receive the bearing 12. The bearing 12 is pressed into the rear of transmission and torque converter case 20. Spreader segments 34 in lower jig 24 expand the previously installed snap ring 26. When the spreader pin 14 is in aperture 16, the snap ring is supposed to snap into position in snap ring groove 28. If the snap ring 26 is not properly positioned in the snap ring groove 28, or is offset in the groove 28, the transmission case 20 can break.

Figure 2:
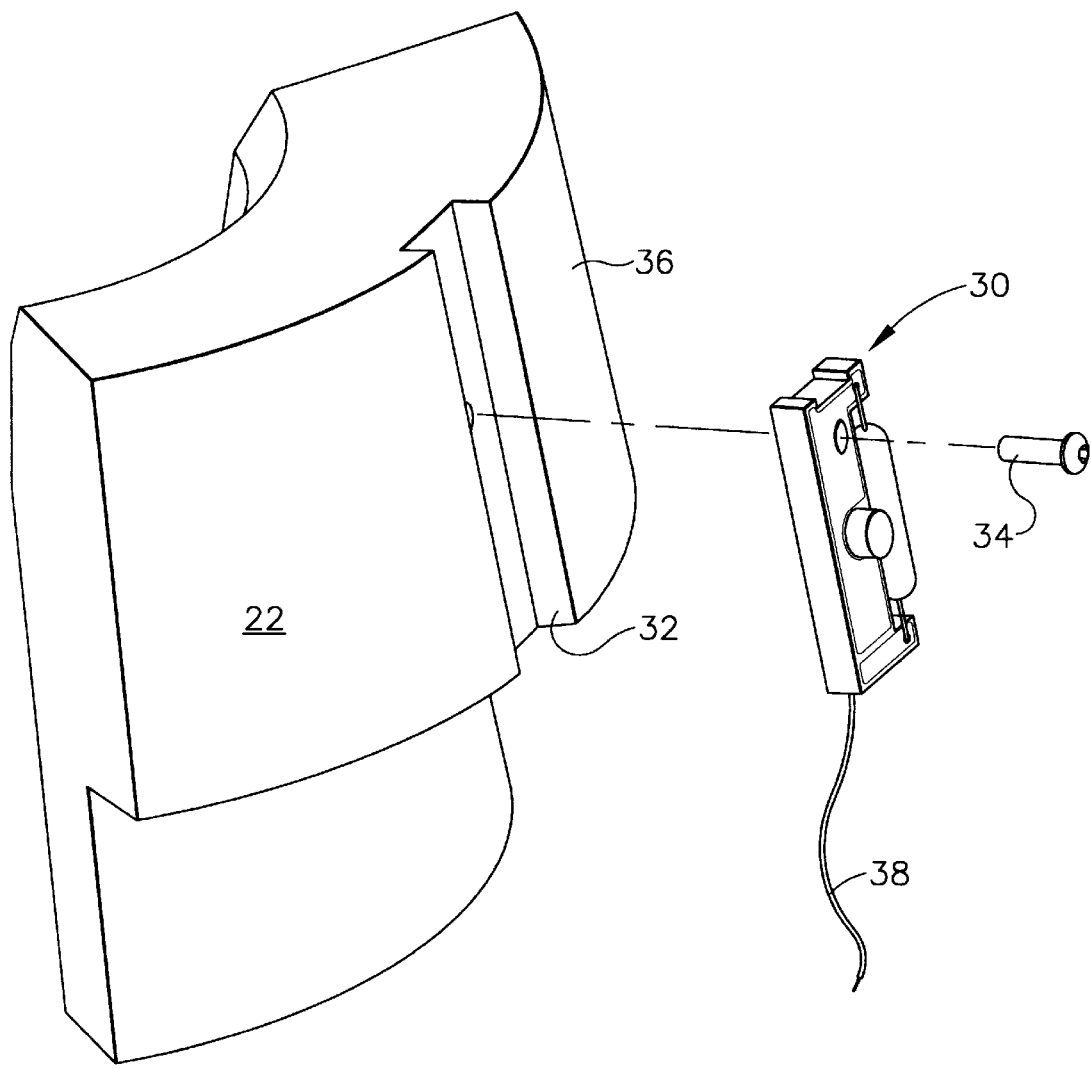
FIG. 2 is an exploded view of a transmission assembly process, showing the snap ring presence detection technique according to the present invention.

The present invention addresses the problem of determining whether the snap ring is present in the assembly, by proposing a novel snap ring detection technique. Referring now to FIG. 2, a bearing/snap ring presence detection system is illustrated. The present invention automatically detects and confirms the presence of the snap ring 26 which is used to secure the bearing 12 in the transmission and torque converter case 20, during the installation process. The detection device of the present invention provides a switch closure output using a magnetic and mechanical sensor means.

Continuing with FIG. 2, the magnetic-mechanical, or magnichanical, sensor 30 of the present invention comprises a slot 32 machined with a fastener 35 or otherwise introduced into spreader fingers 22 within slot 32. The sensor is preferably flush with the exterior surface 36 of the spreader segment 34. A sensing wire 38 extends from the magnichanical sensor 30 and may be attached thereto using any suitable means such as by applying a solder joint 39. The sensing wire 38 is in contact with the sensor and conductive surface 41 at one end and provides a path to ground by way of the spreader finger 22. When the electrical contacts of the sensor switch 42 are closed, electrical continuity between the spreader finger 22 and the conductive surface 41 of the sensor is provided through fastening means 35 of FIG. 2. When installed, the fastening means 35 passes through the mounting hole 46, making contact with conductive surface 41, and fastens into the spreader finger 22.

When the electrical contacts of the sensor are closed, an electrical current is allowed to flow from frame ground, through the fastening means 35, to the conductive surface 41, through the sensor switch 42, to the other conductive surface 41, and out the sensing wire 38. The sensing wire, which is connected to the conductive strip, provides a path to a suitable interface means, such as the interface circuit disclosed in commonly assigned, co-pending patent application U.S. Ser. No. 09/235,725, totally incorporated herein by reference.

Conversely, if the snap ring is properly positioned to be received into snap ring groove, the raised contact will not make contact or complete a circuit through sensing wire 38. Such a condition confirms that the snap ring is present, so as not to compromise the transmission case. With the present invention, therefore, the presence of the snap ring can be determined, alerting an operator to an undesirable situation, or the presence of the snap ring can be confirmed.

In accordance with the present invention, snap ring 26, typically manually installed in the transmission and torque converter case 20, is used to secure the main, secondary, and countershaft bearings 12 in the case 20. The snap ring 26 is expanded by spreader segments 34 to allow the bearing to be received and installed in the transmission and torque converter case 20. Now, with the present invention, if the snap ring 26 is not present during the installation process, i.e., when the spreader segments 34 start to expand outward, the sensor 30 detects the expansion. When the snap ring passes within a sensing distance of the sensor 30 redirection of switches 42 of magnetic lines of flux occur, allowing the sensor to open (when the sensor is normally closed) or close (when the sensor is normally open), as long as the snap ring is within the sensing distance of the sensor 30. The switch will be any type of switch which opens and closes depending on the configuration of the magnetic field, such as a reed switch or a hall effect switch.

Referring to FIGS. 3A–3D and 4A–4D, the non-contact sensor may be of a normally closed configuration (FIGS. 3A–3D) or a normally open configuration (FIGS. 4A–4D), with a conductive surface 41. The normally open or normally closed switch associated with the sensor is mounted to the sensor by any suitable means, such as solder connection 43. For the normally closed configuration, as illustrated in FIGS. 3A–3D, the magnichanical sensor comprises a single magnet 40, such as a rare earth magnet or any other source of magnetic field as known to one of ordinary skill in the art; a normally closed switch 42, typically a mechanical switch; and a sensor base 44, such as a fiber board. Mounting aperture 46 allows the sensor 30 to be fastened within the slot 32, by means of a screw 35.

Figure 3A:
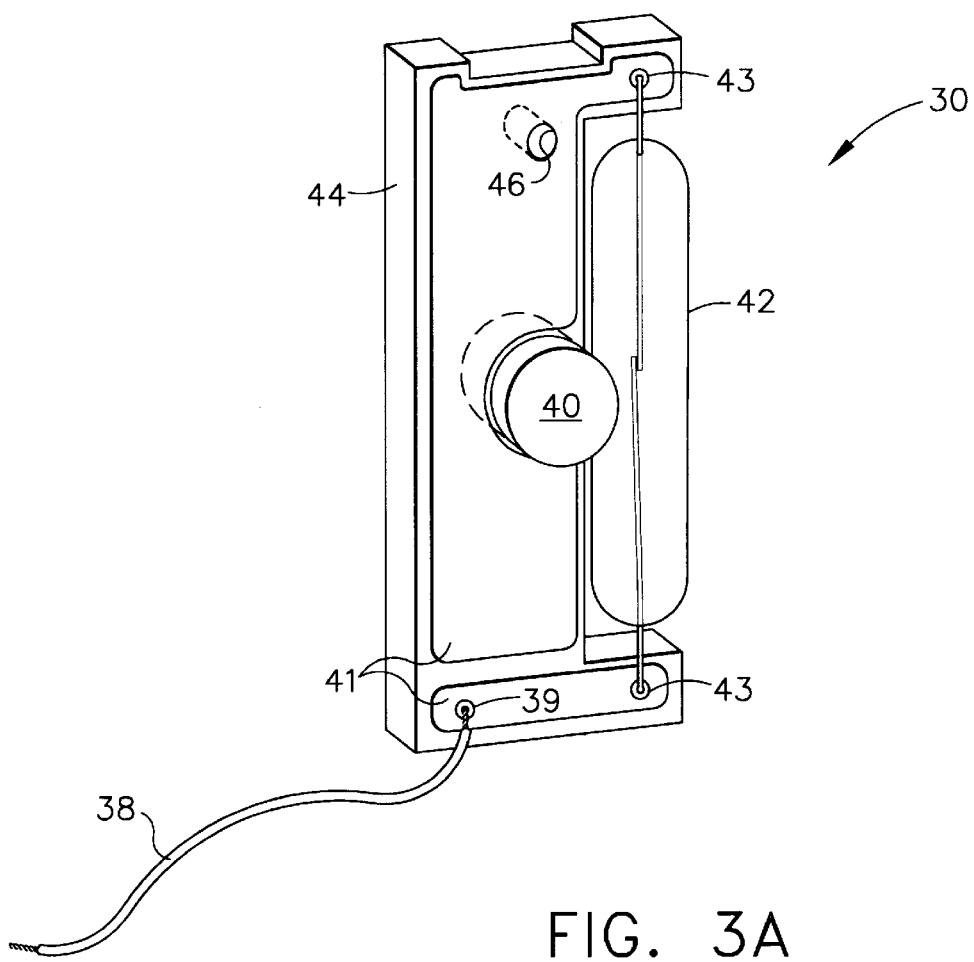
FIGS. 3A–3D illustrate the magnichanical snap ring detector according to the present invention in a normally closed configuration, in accordance with the present invention.
Figure 3B:
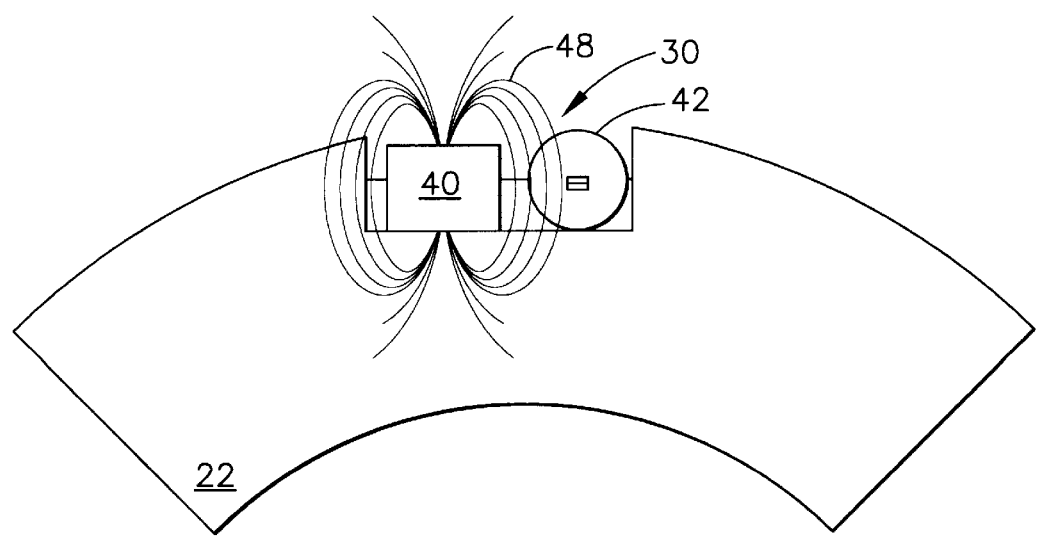
Figure 3C:
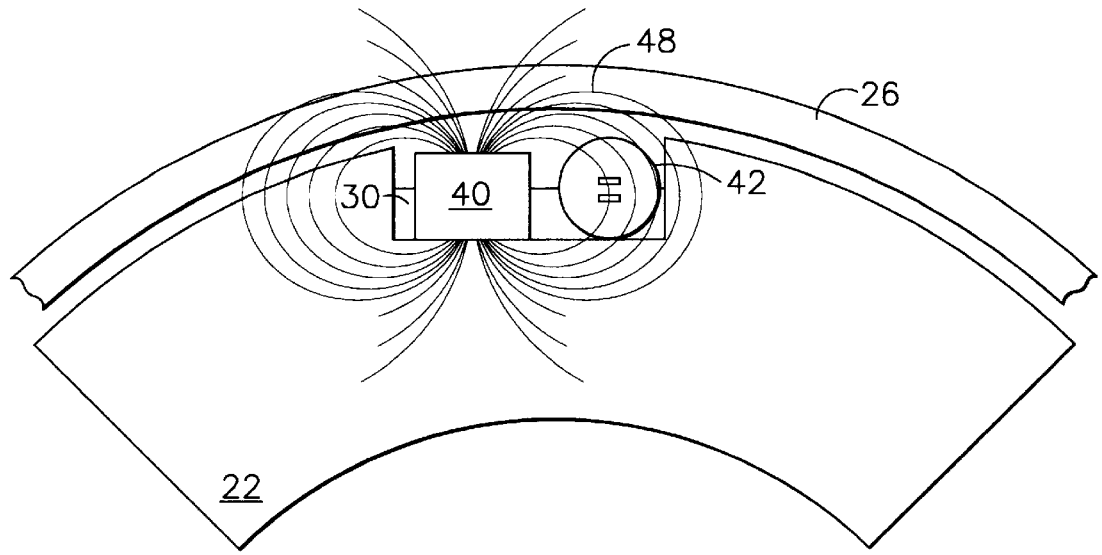
Figure 3D:
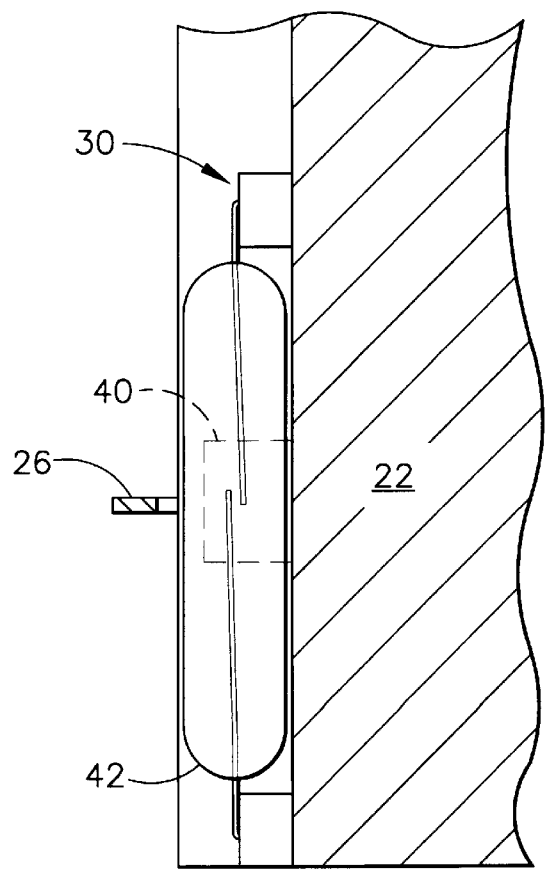

Continuing with FIGS. 3A–3D, all illustrating a normally closed switch, the magnet 40 is located so as to allow its lines of flux 48 to flow through the switch 42. This polarizes it in such a manner that the electrical contact within the switch 42 is caused to close and maintain a closed position, as is illustrated in FIG. 3B. When a ferrous material, such as snap ring 26, is placed in the lines of flux (magnetic field) 48 perpendicular to the switch 42, as shown in FIG. 3C, the flow of the magnetic lines of flux are diverted into the ferrous material (snap ring), allowing the normally closed switch 42 to open and stay open as long as the ferrous material is present in the field, as is illustrated in FIG. 3C. This signifies the presence of the snap ring in the transmission assembly.

Referring now to FIGS. 4A–4D, the sensor 30 is illustrated as a non-contact normally open device. For the normally open configuration, as illustrated in FIGS. 4A–4D, the magnichanical sensor comprises a pair of magnets 40', such as rare earth magnets or any other source of magnetic field as known to one of ordinary skill in the art; a normally open switch 42, typically a mechanical switch such as a reed switch or a hall effect switch; and a sensor base 44, such as a fiber board. Mounting aperture 46 provides an aperture for a fastening device 35 which allows the sensor 30 to be secured in the slot 32.

Figure 4A:
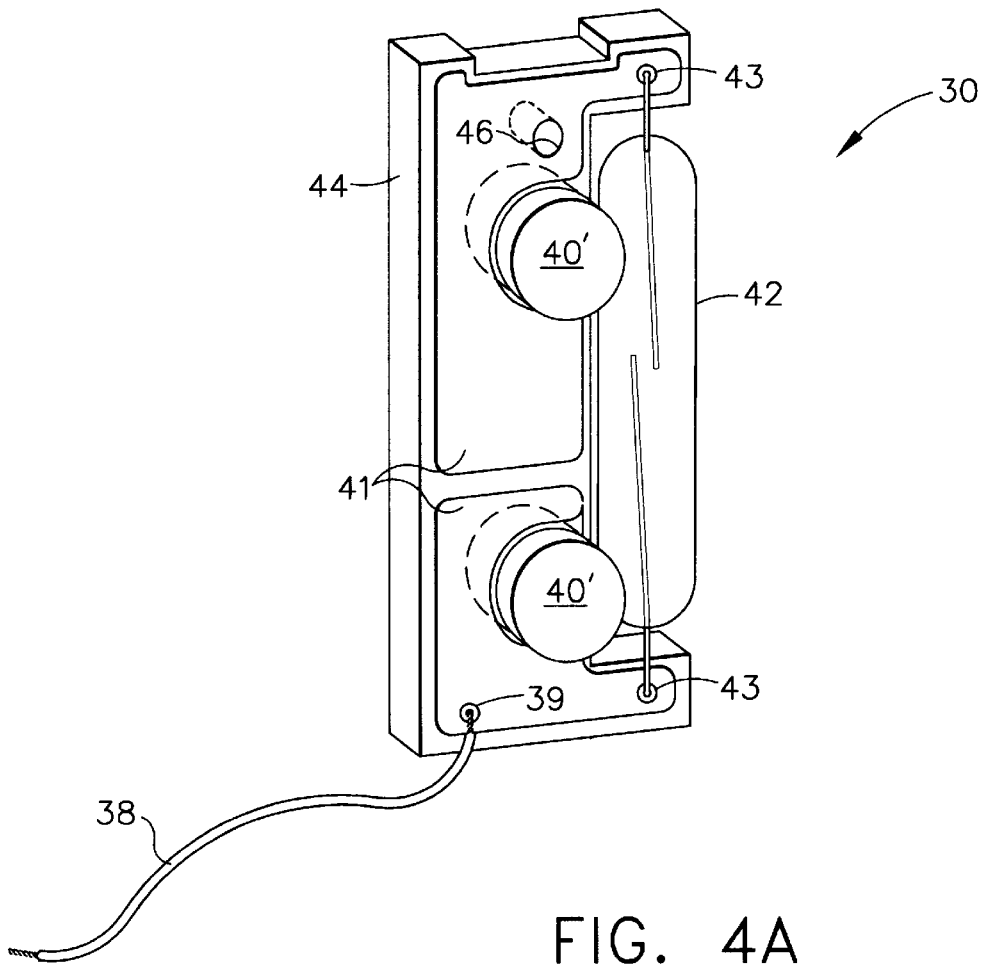
FIGS. 4A–4D illustrate the magnichanical snap ring detector according to the present invention in a normally open configuration.
Figure 4B:
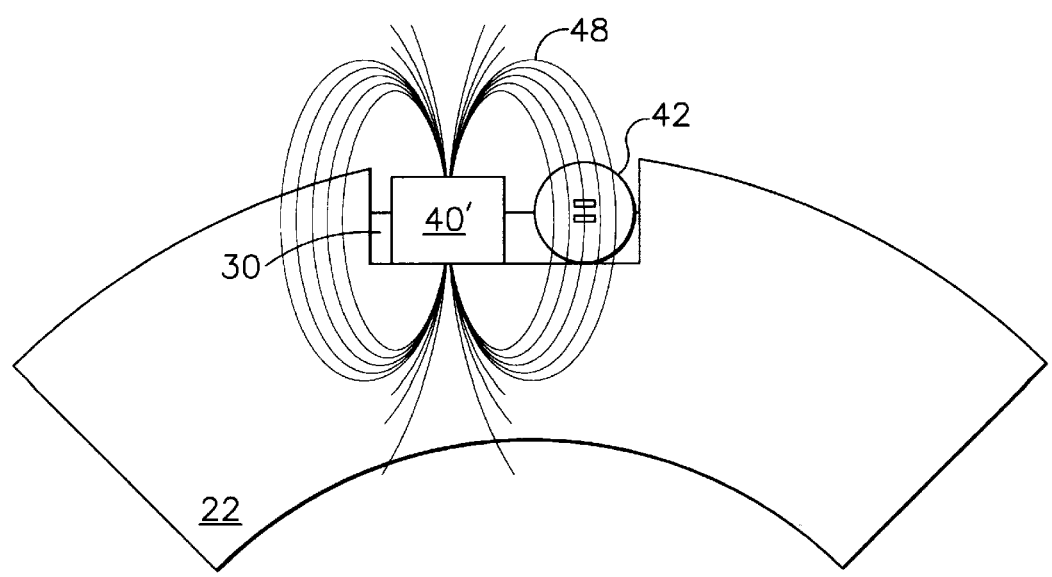

Continuing with FIGS. 4A–4D, all illustrating a normally open switch, the magnets 40', individually referenced as 40'a and 40'b, are positioned so as to create a balanced magnetic field through the switch 42, allowing the lines of flux 48 to flow through the switch 42. This polarizes the switch in such a manner that the electrical contact within the switch 42 is caused to open and maintain an open position, as is illustrated in FIG. 4B, indicating that no snap ring 26 is present.

Figure 4C:
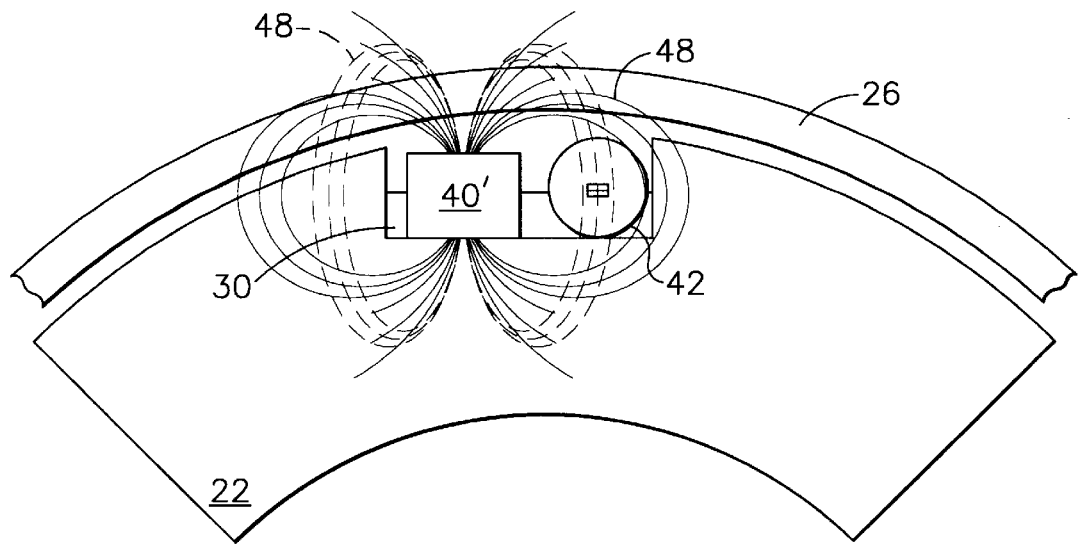
Figure 4D:
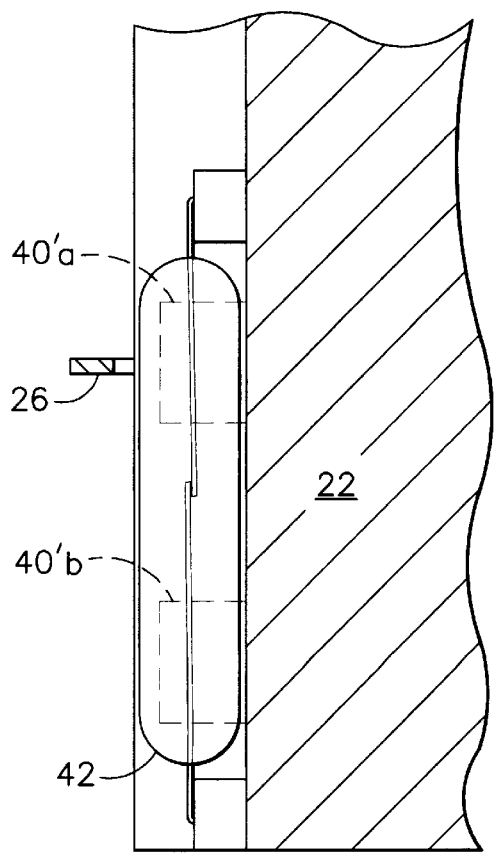

When a ferrous material, such as snap ring 26, is placed perpendicular to the switch 42 and within the field of magnet 40'a, the balanced magnetic field flowing through the switch becomes unbalanced, since the flow of the magnetic lines of flux are diverted into the ferrous material (snap ring). This, in turn, causes the electrical contacts in the switch 42 to close and remain closed as long as the snap ring 26 remains in the magnetic filed, as illustrated in FIG. 4C, and perpendicular to the switch 42. This signifies the presence of the snap ring in the transmission assembly.

The magnichanical sensor means of the present invention offers a number of advantages over the existing art. The present invention offers a non-tactile means to confirm the presence of a snap ring in a transmission assembly process. The sensor is a low profile device particularly suited for operation on flat steel and other magnetic material surfaces, and provides a mechanical relay type contact output. The sensor can be encapsulated in epoxy or other non-conductive materials for operation in harsh environments. The voltage amplitude and type can vary over a wide range without affecting operation, and can be configured for one wire or multi-wire operation.

Having described the invention in detail and by reference to the preferred embodiment thereof, it will be apparent that other modifications and variations are possible without departing from the scope of the invention defined in the appended claims.

What is claimed is:

1. A detection system for detecting presence of a snap ring in a bearing assembly of a transmission system having a transmission and torque converter case, the detection system comprising:

a magnetic field generator for generating a magnetic field;

a switch means positioned within the magnetic field, whereby the switch means switches from a first position to an opposite position when a snap ring is placed in the magnetic field; and means responsive to the switch means to indicate presence or absence of the snap ring.

2. A detection system as claimed in claim 1 wherein the switch means comprises a normally closed switch.

3. A detection system as claimed in claim 2 wherein the magnetic field generator comprises a magnet.

4. A detection system as claimed in claim 3 wherein the magnet is located so as to allow lines of flux to flow through the switch means, polarizing the switch to maintain a closed position.

5. A detection system as claimed in claim 4 wherein the means responsive to the switch means comprises means for detecting diversion of the lines of flux into the snap ring when the snap ring is present, causing the switch means to open, indicating presence of the snap ring.

6. A detection system as claimed in claim 1 wherein the switch means comprises a normally open switch.

7. A detection system as claimed in claim 6 wherein the magnetic field generator comprises a pair of magnets having magnetic lines of flux.

8. A detection system as claimed in claim 7 wherein the pair of magnets are positioned to create a balanced magnetic field through the switch means, allowing magnetic lines of flux to flow through the switch means and polarizing the switch to maintain an open position.

9. A detection system as claimed in claim 8 wherein the means responsive to the switch means comprises means for detecting imbalance of the balanced magnetic field flowing through the switch means when the magnetic lines of flux are diverted into the snap ring when the snap ring is present, causing the switch means to close, indicating presence of the snap ring.

10. A detection system as claimed in claim 1 wherein the switch means comprises a switch which opens and closes in response to configuration of the magnetic field.

11. A detection system as claimed in claim 1 wherein the switch means comprises a reed switch.

12. A detection system as claimed in claim 1 wherein the switch means comprises a hall effect switch.

13. A method for detecting presence of a snap ring in a bearing assembly of a transmission system having a transmission and torque converter case, the method comprising the steps of:

generating a magnetic field;

positioning a switch means within the magnetic field, whereby the switch means switches from a first position to an opposite position when a snap ring is placed in the magnetic field; and providing means responsive to the switch means to indicate presence or absence of the snap ring.

14. A method as claimed in claim 13 wherein the step of positioning a switch means comprises the step of positioning a normally closed switch within the magnetic field.

15. A method as claimed in claim 14 wherein the step of generating a magnetic field comprises the step of using a single magnet to generate a magnetic field.

16. A method as claimed in claim 15 further comprising the step of locating the single magnet to allow lines of flux to flow through the switch means, polarizing the switch to maintain a closed position.

17. A method as claimed in claim 16 wherein the step of providing means responsive to the switch means comprises the step of detecting diversion of the lines of flux into the snap ring when the snap ring is present, causing the switch means to open, indicating presence of the snap ring.

18. A method as claimed in claim 13 wherein the step of positioning a switch means comprises the step of positioning a normally open switch within the magnetic field.

19. A method as claimed in claim 18 wherein the step of generating a magnetic field comprises the step of using a pair of magnets to generate a magnetic field, the pair of magnets having magnetic lines of flux.

20. A method as claimed in claim 19 further comprising the step of positioning the pair of magnets to create a balanced magnetic field through the switch means, allowing magnetic lines of flux to flow through the switch means and polarizing the switch to maintain an open position.

21. A method as claimed in claim 20 wherein the step of providing means responsive to the switch means comprises the step of detecting imbalance of the balanced magnetic field flowing through the switch means when the magnetic lines of flux are diverted into the snap ring when the snap ring is present, causing the switch means to close, indicating presence of the snap ring.

\* \* \* \* \*